US008860891B2

(12) United States Patent
Allen et al.

(10) Patent No.: US 8,860,891 B2
(45) Date of Patent: *Oct. 14, 2014

(54) METHOD AND APPARATUS FOR INCREASING EFFECTIVE CONTRAST RATIO AND BRIGHTNESS YIELDS FOR DIGITAL LIGHT VALVE IMAGE PROJECTORS

(71) Applicant: Allen Video Technology, Inc., Glen Arm, MD (US)

(72) Inventors: Eddie E. Allen, Manhatten, MT (US); Thomas D. Strade, Orchard Park, NY (US); Christopher Coley, Morgan Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,777

(22) Filed: Aug. 2, 2013

(65) Prior Publication Data

US 2013/0314615 A1 Nov. 28, 2013

Related U.S. Application Data

(63) Continuation of application No. 12/541,248, filed on Aug. 14, 2009, now Pat. No. 8,520,149, which is a
(Continued)

(51) Int. Cl.
*H04N 5/64* (2006.01)
*H04N 9/31* (2006.01)
*G03B 21/20* (2006.01)

(52) U.S. Cl.
CPC ........... *H04N 9/3155* (2013.01); *H04N 9/3197* (2013.01); *H04N 9/3182* (2013.01); *G03B 21/2053* (2013.01)
(Continued)

(58) Field of Classification Search
USPC .............. 348/744, 230.1, 674, 760, 788, 745, 348/715, 725, 726, 739, 750, 758, 759, 602, 348/526, 513, 412.1, 423.1, 430.1, 456, 348/460, 490, 317, 333.1, 333.03, 366, 370, 348/202, 208.11, 258, 268, 297, 131, 132, 348/70, 69, 68, 14.15; 353/85, 88, 97, 121, 353/31
See application file for complete search history.

(56) References Cited

U.S. PATENT DOCUMENTS 5,032,924 A 7/1991 Brown et al.
5,379,083 A 1/1995 Tomita
(Continued)

FOREIGN PATENT DOCUMENTS

JP 2001-264728 9/2001
JP 2003107422 4/2003
WO 00/79791 A1 12/2000

OTHER PUBLICATIONS

Machine English Translation of JP 2003-107422; Apr. 9, 2003.

*Primary Examiner* — Jefferey Harold
*Assistant Examiner* — Mustafizur Rahman (57) ABSTRACT

A method and apparatus for increasing the effective contrast ratio and brightness yields for digital light valve image projectors using a variable luminance control mechanism (VLCM), associated with the projector optics, for modifying the light output and provide a correction thereto; and an adaptive luminance control module (ALCM) for receiving signals from the video input board, the adaptive luminance control module producing a signal on a VLCM bus connecting the variable luminance control mechanism and the adaptive luminance control module, the signal causing the variable luminance control mechanism to change the luminance of the light output and provide a corrected video signal for the projector.

8 Claims, 7 Drawing Sheets

Related U.S. Application Data continuation of application No. 11/804,603, filed on May 18, 2007, now Pat. No. 7,575,330, which is a continuation of application No. 10/913,744, filed on Aug. 6, 2004, now Pat. No. 7,220,006.

(60) Provisional application No. 60/493,739, filed on Aug. 8, 2003, provisional application No. 60/577,620, filed on Jun. 7, 2004.

(52) U.S. Cl.
USPC ........... 348/744; 348/715; 348/725; 348/726; 348/739; 348/745; 348/750; 348/758; 348/759; 348/760; 348/788; 348/674; 348/602; 348/526; 348/513; 348/412.1; 348/423.1; 348/430.1; 348/456; 348/460; 348/490; 348/317; 348/333.03; 348/333.1; 348/366; 348/370; 348/202; 348/208.11; 348/230.1; 348/258; 348/268; 348/297; 348/132; 348/131; 348/70; 348/69; 348/68; 348/14.15; 353/31; 353/85; 353/88; 353/97; 353/121

(56) References Cited

U.S. PATENT DOCUMENTS

| | | |
|---|---|---|
| 5,386,253 A | 1/1995 | Fielding |
| 5,442,484 A | 8/1995 | Shikawa |
| 5,519,518 A | 5/1996 | Watanabe et al. |
| 5,550,604 A | 8/1996 | Gale et al. |
| 5,559,551 A | 9/1996 | Sakamoto et al. |
| 5,597,223 A | 1/1997 | Watanabe et al. |
| 5,717,422 A | 2/1998 | Fergason |
| 5,806,950 A | 9/1998 | Gale et al. |
| 5,829,858 A | 11/1998 | Levis et al. |
| 5,923,372 A | 7/1999 | Han |
| 6,462,789 B1 | 10/2002 | Zoso et al. |
| 6,491,398 B2 * | 12/2002 | Takeuchi et al. ............... 353/31 |
| 6,535,207 B1 | 3/2003 | Hiroki |
| 6,587,159 B1 * | 7/2003 | Dewald .................... 348/744 |
| 6,592,227 B2 | 7/2003 | Ouchi et al. |
| 6,631,995 B2 | 10/2003 | Stanton et al. |
| 6,747,708 B2 | 6/2004 | Taniai et al. |
| 6,765,544 B1 | 7/2004 | Wynne Willson |
| 6,795,063 B2 | 9/2004 | Endo et al. |
| 6,816,141 B1 | 11/2004 | Fergason |
| 6,854,851 B2 | 2/2005 | Yamasaki et al. |
| 7,046,852 B2 | 5/2006 | Kerofsky |
| 7,079,693 B2 | 7/2006 | Kerofsky |
| 7,093,941 B2 | 8/2006 | Kawashima et al. |
| 7,190,411 B2 | 3/2007 | Cloutier |
| 7,220,006 B2 | 5/2007 | Allen et al. |
| 7,374,290 B2 | 5/2008 | Sato |
| 7,525,593 B2 * | 4/2009 | Ichikawa et al. ............. 348/370 |
| 7,575,330 B2 | 8/2009 | Allen et al. |
| 2002/0012101 A1 * | 1/2002 | Takeuchi et al. ............... 353/31 |
| 2002/0021292 A1 | 2/2002 | Sakashita |
| 2002/0067413 A1 | 6/2002 | McNamara |
| 2003/0146919 A1 | 8/2003 | Kawashima et al. |
| 2004/0001184 A1 | 1/2004 | Gibbons et al. |
| 2004/0140982 A1 | 7/2004 | Pate |
| 2004/0141157 A1 * | 7/2004 | Ramachandran et al. ...... 353/70 |
| 2005/0052618 A1 | 3/2005 | Ulichney et al. |
| 2006/0187337 A1 * | 8/2006 | Ichikawa et al. ............. 348/370 |
| 2007/0091213 A1 | 4/2007 | Jaspers |
| 2007/0216876 A1 | 9/2007 | Narikawa |
| 2008/0186413 A1 | 8/2008 | Someya |

\* cited by examiner

METHOD AND APPARATUS FOR INCREASING EFFECTIVE CONTRAST RATIO AND BRIGHTNESS YIELDS FOR DIGITAL LIGHT VALVE IMAGE PROJECTORS

CROSS REFERENCE TO RELATED APPLICATION

This application is a continuation of U.S. patent application Ser. No. 12/541,248, filed Aug. 14, 2009, which is a continuation of U.S. patent application Ser. No. 11/804,603, filed May 18, 2007, now U.S. Pat. No. 7,575,330, which is a continuation of U.S. patent application Ser. No. 10/913,744, entitled "METHOD AND APPARATUS FOR INCREASING EFFECTIVE CONTRAST RATIO AND BRIGHTNESS YIELDS FOR DIGITAL LIGHT VALVE IMAGE PROJECTORS", filed with the U.S. Patent and Trademark Office on Aug. 6, 2004, now U.S. Pat. No. 7,220,006, which application claims priority to U.S. Provisional Patent Application No. 60/493,739, filed Aug. 8, 2003, for a "METHOD AND APPARATUS FOR INCREASING EFFECTIVE CONTRAST RATIO AND BRIGHTNESS YIELDS FOR DIGITAL LIGHT VALVE IMAGE PROJECTORS," by E. Allen, and Provisional Patent Application No. 60/557,620, filed Jun. 7, 2004, for an "IMPROVED OPTICAL SHUTTER WITH ECLIPSE VOICE COIL MOTOR (EVCM)," by T. Strade et al., all of which are incorporated herein by reference in their entirety.

FIELD OF THE INVENTION

This invention relates generally to a method and apparatus for increasing effective contrast ratio and brightness yields for digital light valve image projectors, and more particularly to setting the general level of scene illumination removing this control, at least partially, from the duty list of the imager(s) and thereby increasing overall contrast ratio and increasing the available ANSI dynamic for low brightness images/scenes.

BACKGROUND AND SUMMARY

Heretofore, a number of patents and publications have disclosed means for controlling the intensity, contrast or dynamic range of a projection image, the relevant portions of which may be briefly summarized as follows:

U.S. Pat. No. 5,386,253 to Fielding, issued Jan. 31, 1995, and incorporated herein by reference in its entirety, discusses exemplary projection systems utilizing one or more spatial light modulators (SLMs).

U.S. Pat. No. 5,717,422 to Fergason, issued Feb. 10, 1998, discloses a display and method employing a passive light modulator, a source of light, and a control for controlling the intensity of light supplied to the light modulator to provide images of good contrast for both bright and dark scenes. A method of displaying an image, which uses a passive light modulating display apparatus, includes controlling the intensity of light illuminating the display apparatus as a function of a brightness characteristic of the image.

US-20040001184A1 by Gibbons et al., published Jan. 21, 2004 (and claiming priority from PCT/US01/21367 filed Jul. 2, 2001), teaches a system for addressing deficiencies of electronic, SLM-employing projectors. It does so using techniques described as being capable of providing images of sufficient overall quality that they may be used in venues instead of, or in addition to, traditional large-format film projectors without disturbing audience perception that the viewed images are of high quality. The publication describes techniques including pre-modulation, luminance compensation, and partial luminance compensation.

A data and/or video projector's light valve optical engine is generally a device that uses means of modulating a fixed or variable light source based on either the reflective or transmissive properties of certain imaging panels. These panels may be Liquid Crystal Display (LCD), Liquid Crystal on Silicon (LCOS & SXRD), a Digital Micromirror Device (DMD) or any other pixelized imager panel(s) system.

Most high-lumen output video projectors use an arc lamp for the illuminating source. In the case of LCD and LCOS versions of imagers the white light produced by such lamps is usually separated into the primary colors of red, green, and blue using dichroic color-separating optics. Arc lamp separated colors are then passed through a polarizing filter to work with polarizing beam splitters. The primary color beams are either passed through the LCD panels (a transmissive technology) or reflected from LCOS panels (a reflective technology). However imperfections in both the means of polarization of the beams and the inability of the imagers to completely block the illumination source results in a reduction of the contrast ratio (CR) of the image.

DMD imagers utilize non-polarized light from the illumination source, may or may not contain beam splitters and contain micro-mirrors that direct light through the lens or away from the lens as directed to form the image (another reflective technology). Primarily, diffraction & reflection of light from various planes within the DMD and less than perfect reflectivity of the mirrors themselves results in a reduction of the contrast ratio of the image.

For the purposes of this presentation optical components between the illumination source (lamp) and the outermost exit lens are considered the projector's "optical engine." Optical engines include but are not limited to dichroic beam splitters (where applicable), polarizers (where applicable), imaging panel(s), re-combining optics (where applicable), light tunnels, light collimators, irises, etc.

The present invention is directed to a method and apparatus to increase the effective contrast ratio and brightness yields for all types of data/video digital light valve image projectors. This concept is partially based on the fact that the contrast ratio dynamic from such devices displaying a "bright" image is limited to a projectors simultaneous contrast capability (commonly measured as ANSI contrast ratio—hereinafter ANSI CR), and the fact that the ON/OFF contrast ratio limits a projector's "dark" image's dynamic to a point much less than a light-valve projector's ANSI CR capability. It is also based on the fact that current light valve projectors (LCD, LCOS, SXRD, DMD) have extremely limited ON/OFF contrast ratios, when compared to standard cathode ray tube (CRT) type projectors, and are in need of this design improvement.

CRT type projectors are able to maintain, for the most part, full ANSI CR regardless of the image's general level of illumination due to the variable intensity output capability of their tubes. However, light valve projectors have a steady state of illumination source (i.e. a lamp) that is modulated solely by the imaging device(s). As such it is necessary for the imaging devices, regardless of type (DMD/LCOS/SXRD, LCD, etc) within the projector, to generate all of the image's dynamics. Since all these imaging devices "leak" light to varying degrees (i.e., areas intended to be dark or off are not completely dark), this limits the projector's ability to maintain full ANSI CR, particularly at the lower intensity levels resulting in a lack of depth in the image.

Attempts have been made in the past to vary a projector lamp's output to boost on/off CR, but these have failed to provide significant improvement due to the limited variable light output range of lamps (maintaining sustained ignition) and the fact that varying the lamp intensity drastically changes the color balance (balance in spectral output) of the lamp, thus limiting most light-valve projectors to one or two illumination levels from their bulbs (current examples: bright and economy-lamp modes). None of the lamp intensity schemes interact in concert with the imager(s) or help to produce better engine contrast ratio yield as the invention described herein does, neither do projectors with simple fixed or manually or electrically adjustable irises. The present invention relies on the technological premise that digital imaging devices perform three basic functions, among others, in order to generate a usable image for display:

1) modulate imager(s) with a source signal to create a recognizable pattern (i.e. an image);
2) set the general level of scene illumination; and
3) "paint" the image to create color(s) with a variety of available techniques.

The present invention focuses on the second function set forth above—setting the general level of scene illumination, where this function is removed, at least partially, from the duty list of the imager(s) for the primary purpose of increasing overall contrast ratio and increasing the available ANSI dynamic for low-brightness images/scenes. In order to accomplish this function outside of the typical projection optical imaging engine, one aspect of the invention is intended for implementation in two stages, which are described in more detail below.

A first component of the present invention is a variable luminance control mechanism (VLCM). The VLCM is, in one embodiment, a special high-speed, temperature-resistant, electronically controllable iris system placed before, after or inside the optical engine of any light-valve projection device. A single (or multiple in some cases) iris system will be located at the point(s) either pre- and/or post-imager(s) within the optical engine that yields the best balance of results. This location will vary from projector to projector depending upon its particular design and on the intended results. In the case of single digital light processing (DLP) chip optical engines, this calls for a single iris system placed post-imager at a focal convergence point located post imager. The purpose of this adjustable iris is to vary the general scene illumination level, as the input signal varies, at a speed that is generally undetectable to the human eye. The main benefit of the luminance control function provided by the iris is extending the ON/OFF contrast ratio well beyond the ability of the imaging devices themselves. In other words, the use of the iris improves the ON/OFF contrast ratio by lowering the scene illumination on dark scenes to a nearly completely off level and thereby reducing the light "leaking" through the optical path of the projector. As will be described below, the use of one, or multiple irises, may also be employed to modulate or compensate for lamp brightness, including changes in or decay of the lamp/illumination source.

The addition of an iris does not change the color balance of the illumination (lamp) source or the imager(s); it is spectrally neutral in action. The shape of the iris may also be changed to assist in contrast ratio yields. For example, an oval or "cats eye" shaped iris may lend itself to a better contrast ratio yield than round or multi-sided (polygon) versions. Moreover, the present application contemplates that future implementations could also use extremely fast reacting photosensitive optics that would variably turn darker or lighter to either enhance or replace the mechanical iris method.

A second component employed in the present invention is an Adaptive Luminance Control Module (ALCM), which is coupled to the VLCM. The ALCM is a video signal processing system including circuitry and components that will operate and set the variable aperture opening or opacity of the VLCM and provide a corrected video signal to the input of the projector. This electronic luminance processing will follow the video input signal, tracking either the general (average) illumination level or the brightest point(s) in the signal (i.e., peak level detection) or any combination, and will output two different types of signals:

1) The VLCM drive signal. When fed a resultant, processed (analog or digital) signal, the VLCM will set the general scene illumination level. This optimizes both the engine's contrast (both absolute ON/OFF and ANSI CR) and the lumen output for the particular level of illumination that is needed to accurately reproduce the image. The VLCM drive signal is, effectively proportional to the input intensity of the video image (average or peak). The present invention contemplates the possibility that VLCM feedback may be required, and may employ one or more sensing mechanisms or circuits to indicate VLCM position or condition.
2) The image signal. The video output signal, post processing, is passed on to the projector's imager stage input. This image signal is processed and manipulated to take full advantage of the VLCM optical restriction capability. This unique relationship is described below. The processing for the image signal is primarily look-up (gamma) and gain based, along with a "black level clamp". Output gamma will not track identically to the input signal's gamma; in other words, it will "adapt" to the input signal's illumination dynamics for optimization with the iris. There are various algorithms that will enable the desired functionality and will improve the technology. As used herein, "black level clamp" is a term describing the input to output signal proportion at 0 IRE. In other words, no matter what function the gamma tables and algorithms perform on the video signal; "0" input always equals "0" output.

In accordance with the present invention, there is provided an apparatus for improving the operation of a digital image projector, comprising: a video input board of the projector; a optical engine of the projector, said optical engine receiving video signals and generating a light output for at least one primary color from; optics for transforming the light output from said light engine to a focused image for projection to a display screen; a variable luminance control mechanism (VLCM), associated with the optics, for receiving the light output and provide a correction thereto; and an adaptive luminance control module (ALCM) or processor, for receiving signals from said video input board, said adaptive luminance control module producing a signal on a VLCM bus connecting the variable luminance control mechanism and the adaptive luminance control module, said signal causing the variable luminance control mechanism to change the luminance of the light output and provide a corrected video signal from the projector.

In accordance with another aspect of the present invention, there is provided a method for improving the operation of a digital image projector, comprising the steps of: receiving image signals from a video input board in the projector; using an adaptive luminance control module, producing an output signal on a VLCM bus connected to the adaptive luminance control module, said signal providing control information for a variable luminance control mechanism, located within the optical path of the projector; and adjusting the variable luminance control mechanism to produce a corrected light output from the projector.

In accordance with yet another aspect of the present invention, there is provided an apparatus for improving the operation of a digital image projector, comprising: a video input board of the projector; a light engine of the projector, said light engine receiving video signals and generating a light output for at least one primary color there from; optics for transforming the light output from said light engine to a focused image for projection to a display screen; a variable luminance control mechanism, associated with the optics, for receiving the light output and provide a correction thereto; and an adaptive luminance control module, for receiving signals from said video input board, said adaptive luminance control module producing a control signal, wherein said variable luminance control mechanism operates in response to the control signal to change the luminance of the light output and provide a corrected video signal for the projector In accordance with another aspect of the present invention, there is provided a method for improving the operation of a digital image projector, comprising the steps of: receiving video signals from a video input board in the projector; and producing a first signal, using an adaptive luminance control module, to provide control information for a variable luminance control mechanism located within the optical path of the projector and a second signal which is a modified video signal, whereby the variable luminance control mechanism operates to produce a modified light output from said digital image projector.

One aspect of the invention is based on the discovery that the general level of scene illumination may be adjusted in a video projector to improve the effective contrast ratio. This discovery avoids problems that arise in conventional light projectors due to light leakage, etc. Using aspects of the present invention, overall contrast ratio and the available ANSI dynamic for low-brightness images/scenes may be significantly increased. In order to accomplish this function outside of the typical projection-imaging engine, this aspect is implemented using the ALCP and VLCM described herein.

The techniques described herein are advantageous because they can be adapted to any of a number of light projectors. As a result of the invention, it is possible to produce digital light projection systems with improved overall contrast ratios and available ANSI dynamics for low brightness images/scenes.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements.

Figure 1:
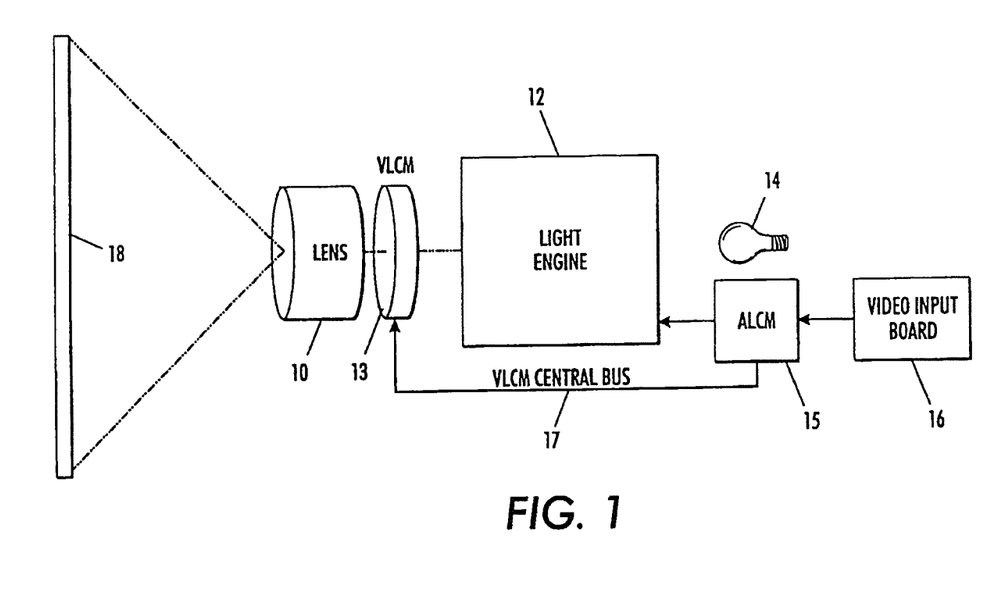
FIGS. 1 and 2 are exemplary schematic overviews of a conventional light projection system with the components of the present invention incorporated therein.
Figure 2:
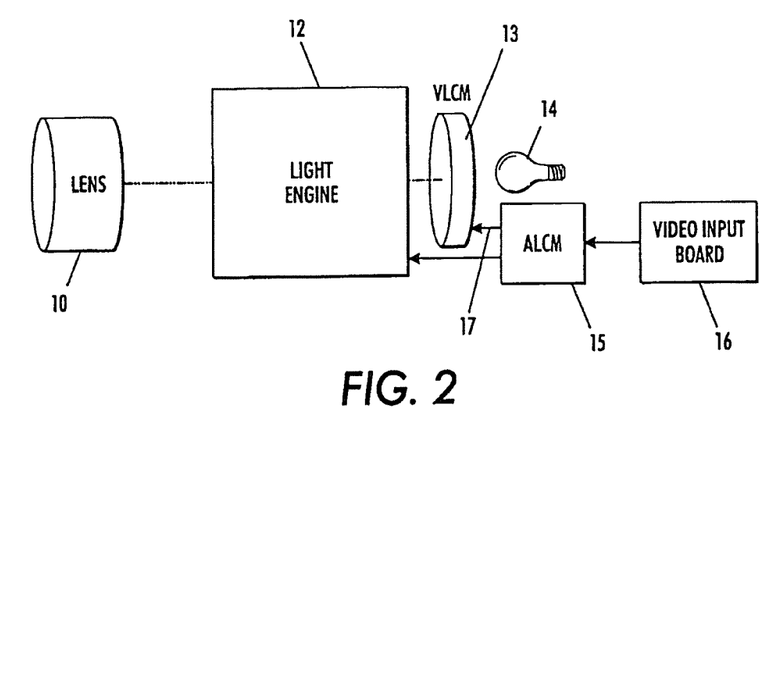

As depicted in FIG. 1, a conventional light valve projection display system includes a video input board 16, where video signals are received and processed to produce a plurality of channels (e.g., 3-colors) of color signals. The color signals are then directed to a light engine 12 in which the color signals are used to transform light from a source 14 into a light output on each of the three color channels, the light output then being directed through optics represented by lens 10 for projection onto a screen or display surface 18. As depicted in FIGS. 1 and 2, the present invention includes at least two additional components, a variable luminance control mechanism (VLCM) 13 and an adaptive luminance control module (ALCM) or processor 15.

In one embodiment, the VLCM 13 is a special high-speed, temperature resistant, electronically controllable iris system placed into the optical path of any light-valve projection device. A single-iris, or in some cases multiple-iris, system will be located either pre- (FIG. 2) or post-imager(s) (FIG. 1) within the optical engine, so as to yield the best balance of results. This location will likely vary from projector to projector depending upon the particular design of the projector. In the case of single digital light processing chip optical engines a single iris system, placed post-imager at the focal convergence point, would be used. The purpose of the adjustable iris is to vary the general scene illumination level as the input signal varies—at a speed that is generally undetectable to the human eye. The primary result is that the ON/OFF contrast ratio is extended well beyond the ability of the conventional imaging devices themselves. For example, by using the iris to lower over-all lower light level for a dark scene the impact of smaller changes in luminance for individual regions of the image will be enhanced—thereby improving the contrast ratio. Further details of an exemplary iris system are described below relative to FIGS. 4-7.

The addition of an iris does not change the color balance of the illumination (lamp) source or the imager(s) as it is spectrally neutral in action. As will be appreciated, in a three-chip/iris system (e.g., FIG. 9), where each color may be separately controlled by an iris, there may be a change to color balance if the colors are differently modulated. As an alternative to a mechanical iris as described relative to VLCM 13, the present invention further contemplates the use of extremely fast reacting photosensitive optical components, whereby the components would variably turn darker or lighter to either enhance or replace the mechanical iris as described above.

Figure 8:
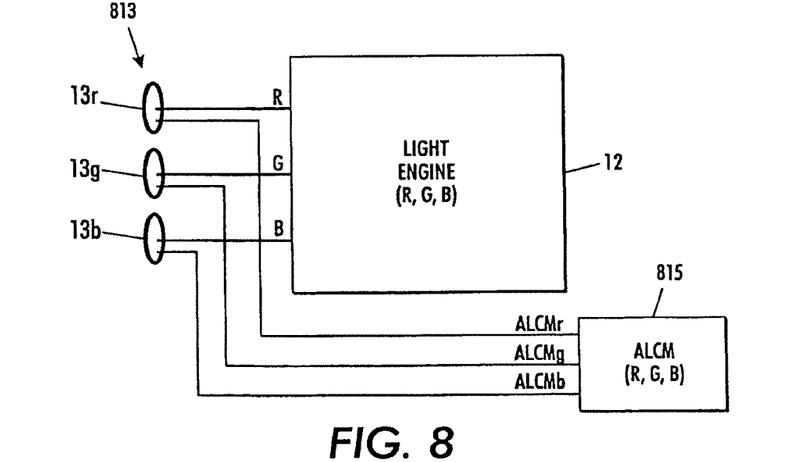
FIGS. 8 and 9 are alternative embodiments of the present invention including aspects of the embodiments depicted in FIGS. 1 and 2.
Figure 9:
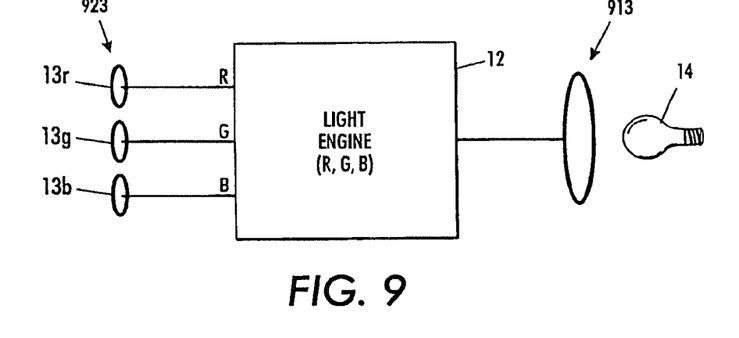

For example, the NanoChromics™ display, provided by NTERA Ltd. may be employed in the control of scene illumination. The NanoChromics™ display is an electrochromic device forming with a nanoporous-nanocrystalline film having a controllable transmittance in response to electrical signals as described, for example, in U.S. Pat. No. 6,301,038 to Fitzmaurice, et al., issued Oct. 9, 2001 for an "ELECTROCHROMIC SYSTEM," the teachings of which are incorporated herein by reference in their entirety. Alternatively, a NanoChromics™ display may also be employed as a secondary modulation device, where in addition to a primary ALCM, a secondary modulation device such as the NanoChromics™ display could be used to further control the contrast ratio of a projection system. For example, as depicted in FIGS. 8 and 9, the ALCMs 813 or 913, 923, individually or in combination, could be employed to provide a secondary modulation source.

As depicted in FIG. 1, the adaptive luminance control module or processor 15 is coupled to the VLCM via a bus 17 (VLCM bus) or similar means for transferring data and control signals. The adaptive luminance control module is a video signal processing system operating on a conventional processor or specialized signal processing chip or chipset in accordance with pre-programmed instructions. The ALCM will operate and set the variable aperture opening or opacity of the VLCM(s) and provide a corrected video signal to the input of the projector. In other words, in addition to analyzing the video data to determine the appropriate VLCM settings or characteristics for a projected scene, the ALCM further operates to modify the image signal to the projection system. The electronic processing of the image signal will follow the video input signal to track, for example, the general (average) illumination level or the brightest point(s) in the signal (i.e., peak level detection). In alternative embodiments, it is contemplated that the processing may include any combination of average or peak level detection, and further including luminance detection by percentage. In any event, the processing will result in the output of at least two types of signals, as follows:

1) a VLCM drive signal; and
2) a processed image signal.

For the VLCM drive signal, when fed a resultant, processed (analog or digital) signal, the VLCM will set the general scene illumination level. This optimizes both the engine's contrast (both ON/OFF and it's relationship to ANSI CR) and the lumen output for the particular level of illumination that is needed to accurately reproduce the image. The VLCM drive signal is, effectively proportional to the input intensity of the video image (average or peak or any combination). Furthermore, The present invention further contemplates the possibility that VLCM feedback may be required, and may employ one or more sensors or similar sensing mechanisms or circuits to indicate a VLCM characteristic such as position or condition.

Also, as noted above, the video output signal, post processing, is passed on to the projector's input. This image signal will be processed and manipulated to take full advantage of the VLCM optical restriction capability. This unique relationship is described in detail below. The processing for the image signal is primarily gamma look up and gain based, along with a "black level clamp". Output gamma will not track identically to the input signal's gamma; in other words, it will "adapt" to the input signal's illumination dynamics for optimization with the iris or modulator of the VLCM. There are various algorithms that will enable the desired functionality and will improve the technology, the general nature of which are described generally below and with respect to FIG. 10. As used herein, "black level clamp" is a term describing the input to output signal proportion at zero IRE. In other words, no matter what function the gamma tables and algorithms perform on the video signal; "0" input always equals "0" output.

Output gamma will not track identically to the input signal's gamma. In other words, it will "adapt" to the input signal's illumination dynamics for optimization with the iris. As will be appreciated by those skilled in the art, there are various algorithms that may be employed to further improve the response of the system.

Figure 10:
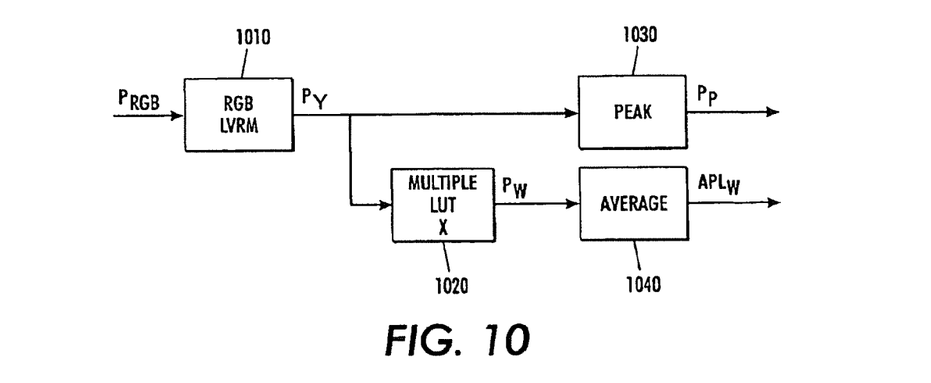
FIG. 10 is a flow diagram generally illustrating the analysis of a frame in accordance with an aspect of the present invention.

Referring briefly to FIG. 10, depicted therein is a general flow diagram illustrating an exemplary series of processing steps that may be employed to produce the signals or outputs described above. As represented in the figure, the following notation is used: $P_y$ represents pixel luminance; $P_w$ is the weighted pixel value; $P_p$ is the peak pixel value; and APL an average pixel level.

More specifically, for a given frame of video, $P_{RGB}$ represents a pixel in RGB space, which is stored in the frame. Subsequently, the calculation would proceed to determine the Average Picture Level (APL). In one embodiment, the APL is a sum of the luminance across all pixels, which is then divided by the pixel count. As illustrated in FIG. 10, the Weighted Average Pixel Level ($APL_w$) is based on the sum of squares or other multiplier (weighting) scheme as carried out at block 1020, and then divided by pixel count to determine an average at block 1040. As indicated by the LUT (Look-Up Table) in block 1020, a preferred embodiment would include the ability to modify the table or values therein so that any algorithm for weighting could be applied. For the calculation of the peak value as represented by block 1030, the peak may employ a peak luminance, a peak independent component value (e.g., Red, Green, Blue), or even a range of component values (Pr, Pb).

The present invention further contemplates the use of other approaches to analyze a frame or scene, including a histogram, where for each possible value of a pixel, the numbers of pixels of that value are counted. Alternatively, motion, cross-correlation or other algorithms may be employed to determine if a frame/scene change has occurred. As another alternative, the spatial distribution/object size may be analyzed, for example: (i) using regional histogram or APL analysis; (ii) using adjacent pixels or blocks; (iii) using size or measure the size of an object in pixels horizontally/vertically; and/or (iv) by taking a contrast image and size inside the contours. Subsequently, using one or more of the results from above analyses the results may be employed to do one or more of the following:

Select a LUT based on APL alone to act as a correction to the stored pixel data;
    Use the peak values to limit which of the LUT's may be selected;
    Match the histogram to a set of window/threshold curves and use the index of the matched curve to determine the LUT and image correction;
    Based on the LUT selection pick an IRIS position; or
    Alternatively select an iris position based on any of the above calculations and select the LUT from the iris position.

Furthermore, the following MatLab code represents another alternative method for analyzing and correcting gamma, where three primary operations are carried out:

---

```
function void = gammacorrection(cr,lightoutput,adjust,suffix);
%where cr is the contrast ratio of the system at the stated lightout. adjust is a boolean to
    decide wether to do the eclipse process.
%Please note that most of this design script was written back when a continuously
```

```
    variable iris was the preferred means.
%A stepper motor will require a little more work but this analysis still holds.
%A stepper motor implementation is slightly more complex and being unique isn't
    addressed here.
%##############step 1: Gamma design####################
%This step is the system design part. This portion is performed before hand.
gamma = 2.35 %This is a compromise gamma for the incoming video. Incoming video is
    encoded between 2.2 and 2.5. This should work well enough
maximageintensity = 2756; %given the algorithm below in step 2 this is the maximum
    value for a 1280 X 720 white image.
%thresholds for image brightness based on the equation shown in step two. These values
    are pretty much imperically derived.
high = 351 %image brightness needed for iris to be fully open. Any image brighter than
    this will be displayed at full light.
low = 10 %image brightness needed for iris to be fully closed. Darker images than this will
    not close the iris further.
    %Note: the values I have here are through my own testing. high should be no less than
        351 which is either a 75 IRE blue or 75 IRE red image
    %I expect for a 3:1 contract ratio I expect about 40% of movie images to be higher than
        the high region, about 20% to be darker than the lower region and 40% to be
        imbetween
%Designing the amount of light contraction in the image.
minlight = 1/3 %amount of light at the smallest iris opening as a ratio of full light. In
    other words we are doing a 3:1 contraction.
minstep = .99 %ideally this is the maximum decrease in lightlevel you could perform at
    each iris position based on Poynton's work.
numofluts = ceil(log10(minlight)/log10(minstep)) %number of look up tables
    required to satisfy minstep.
lightlevelsindex = 0:numofluts;        %simple index array 0,1,2, up to numofluts.
lightlevels = minstep.^lightlevelsindex;    %lightlevels corresponding to the LUTs:
    1.0, .99, .9801, ..., .333
lightlevels = fliplr(lightlevels) %This puts the lightlevels from darkest to brightest
    %Note: the above variables assume that we have complete control of the iris. Obviously
        a stepper motor will have discreet position that might not be .9801 of original light.
%The principal of operation is to darken the light source (i.e. close the iris) and digitally
    brighten the image to compensate
% Obviously something has to be compromised and in this case it is the infrequently used
    upper IRE's on dark images which need to be elegantly "crushed".
unalteredratio = 2.1; %for incoming video, in relation to the missinglevel, this is the
    portion of the incoming image that we want to preserve unaltered.
unalteredlightlevels = 10.^(log10(lightlevels).*unalteredratio) %at each of the light
    levels this the unaltered
%for 50% lightoutput we want to preserve everything from .23 light level down so
%.23/.5 = .46 of the mirror dutycycle
%.46^(1/2.35) = .7186 of the signal input signal needs to be uncompressed after
    compensation
%
RGBratio = 0 : 1/255 : 1;       %8bit RGB in terms of percent of full signal
RGBintensity = RGBratio.^gamma %De-gamma is applied. Now the RGB values are
    in a percent of light output.
luts = zeros(numofluts+1,256);
for i = 1:numofluts
    dark = RGBintensity <= unalteredlightlevels(i);
    bright = RGBintensity >= unalteredlightlevels(i);
    lowintensities = (RGBintensity .*dark)/lightlevels(i); %this expands the RGB
        levels
    [intensity.location] = max(lowintensities);      %this finds what RGB value
        that compression has to start at
    gammacompression = log10(intensity)/log10(RGBratio(location));
    highintensities = (RGBratio .* bright).^gammacompression; %this compresses
    newRGBintensities = lowintensities + highintensities;    %combining the bright
        portion of the table with the dark
    newRGBratio = newRGBintensities.^(1/gamma);     %Now we are back in
        gamma encoded world
    luts(i,:)= round(newRGBratio*255);
end
luts(numofluts+1,:)= 0:255; %a bright image is unaltered so 0 to 255 in equals 0 to 255
    out.
luts(40,:)
luts(numofluts+1,:)
lutindex = zeros(1,maximageintensity+1);       %As stated below the max image
    intensity calculation is 2756
lutindex(1:low+1) = 1;     %from the low threshold down the brightest lut is chosen
    and the darkest iris position
lutindex(high+1:maximageintensity+1) = numofluts+1; %from the high threshold up
    the lut is unchanged and the lightest iris position is used
lulindexstep = numofluts/(high – low)
lutindex(low+1:high+1) = round(lutindexstep*(0:high−low))+1 %adding in the middle
    ground
```

```
lightindex = lightlevels(lutindex) %Using the lutindex values we can determine the
    corresponding lightindex
%compensate for less than perfect black
%CRatmin = 5000
%CRatmax = 2000
%CRdifference = CRatmin−CRatmax;
%CRstepsize = CRdifference/length(lightlevelsindex);
%CRsteps = CRatmax:CRstepsize:CRatmin;
%Blacklevels – 1/CRsteps;
%minimum percent change
%##############Step 2: Applying map####################
%In an actual projector design this step would need to be performed continuously on each
    frame coming in. Here it is performed on stills
for dummy = 1:100        %for all the test images that you want to do control c will take
    you out at any point.
%LOADing image file
if (~exist('fid'))
    [filename,pathname]=uigetfile(strcat('C:\ ...\*.bmp'),'Load Data');
    fname = strcat(pathname.filename);
    imin = imread(fname,'bmp'); %reading in image in three separate 8 bit arrays - one
        for R,G, and B
elseif (fid <= 0)
    error('Invalid File ID');
end
%The intensity equation = G^2*2+B^2+R^2 on the upper three bits while the image is still
    in 24 bit color.
imdouble = double(imin); %changing from units format to double floats which Matlab
    uses
imnormalized = imdouble/255;
figure(1) %plotting picture
image(imnormalized);
if adjust         %adjust for the projector would always be on
intensity = bitshift(imdouble,−5,8); %bitshifting to only use the top three bits;
size(intensity)
min(min(min(intensity)))
max(max(max(intensity)))
intensity(1,1,1)
intensity = intensity.^2; %squaring every element in imdouble.
intensity(1,1,1)
intensity(:,:,2) = bitshift(intensity(:,:,2),1,32); %doubling the intensity of green pixels
    since they are brighter
intensity(2,1,1)
intensity = sum(sum(sum(intensity))) %summing up entire image intensity to get value
    of brightness of the incoming image.
%Intensity can range anywhere from 0 for black up to 180633600 for a full white image
    (7^7*(1+2+1)*1280*720)
intensitysmall = bitshift(intensity,−16,12) %this brings the number down to 0 to 2756
    and thus the lutindex equals 2757 values.
lutneeded = lutindex(intensitysmall+1) % lutindex is an index file which points to
    which of the roughly 100 or so available LUT's to use
lut = luts(lutneeded,:) % getting the necessary 256 value lut
output = lut(imdouble+1); % mapping the old RGB values to new RGB values
lightneeded = lightindex(intensitysmall+1) % this specifies what light level the iris
    should be as a ratio of full white.
% Ultimately lightneeded would need to be the step number on the stepper motor to get
    the light correct.
% Also at this moment lightneeded is linked 1:1 to lutneeded
figure(2)
outputnormalized = output/255;
image(outputnormalized)
end
%######Step 3: Simulating/Demonstrating the before and after effect#####
%The actual image manipulation stops at step 2. This step is mearly for
    simulating/demonstrating what an eclipse DLP projector would look like
%by using a computer CRT which typically has CR's in the 10000:1 or more range.
crindex = cr./lightlevels %This states that the contrast ratio goes up by an equal factor
    of the amount of light reduced (approximately true)
CRTcr = 10000;
CRTblacklevel = 1/CRTcr;
if ~adjust       %if the no Eclipse gamma adjustment is wanted to show before
    images
    outputintensity = imnormalized.^gamma;
    outputintensity(1,1,1)
    blacklevel = 1/cr
    outputintensity = (outputintensity+blacklevel)./(1+blacklevel);
    outputintensity(1,1,1)
    outputintensity = outputintensity * lightoutput;
    outputintensity(1,1,1)
```

```
    outputintensity = outputintensity − CRTblacklevel;    %compensating for the
       computers CRT less than perfect black
    outputintensity(1,1,1)
    outputintensity = (outputintensity >= 0).*outputintensity; %this caps the blacklevel
       no less than 0
    outputintensity(1,1,1)
    outputnormalized = outputintensity.^(1/gamma);
    outputnormalized(1,1,1)
else              %if eclipse is wanted to show after images
    outputintensity = outputnormalized.^gamma;
    outputintensity(1,1,1)
    lutneeded
    cradjusted = crindex(lutneeded)
    blacklevel = 1/cradjusted
    outputintensity = (outputintensity+blacklevel)./(1+blacklevel);
    outputintensity(1,1,1)
    outputintensity = outputintensity * lightneeded;
    outputintensity(1,1,1)
    outputintensity = outputintensity − CRTblacklevel;   %compensating for the
       computers CRT less than perfect black
    outputintensity(1,1,1)
    outputintensity = (outputintensity >= 0).*outputintensity; %this caps the blacklevel
       no less than 0
    outputintensity(1,1,1)
    outputnormalized = outputintensity.^(1/gamma);
    outputnormalized(1,1,1)
end
figure(3)
image(outputnormalized)
    filename2 = input('press enter to store file (control-c cancels)','s');
%if length(filename) == 1 & filename(1) ~= 'n'
    fname = strcat(pathname,filename(1:(length(filename)−4)),suffix,'.jpg');
%   imwrite(outputnormalized,fname,'bmp');
    imwrite(outputnormalized,fname,'jpg','Quality',100);
    %end
end %This end closes the step 2 and 3 loop for processing multiple images
```

Figure 3:
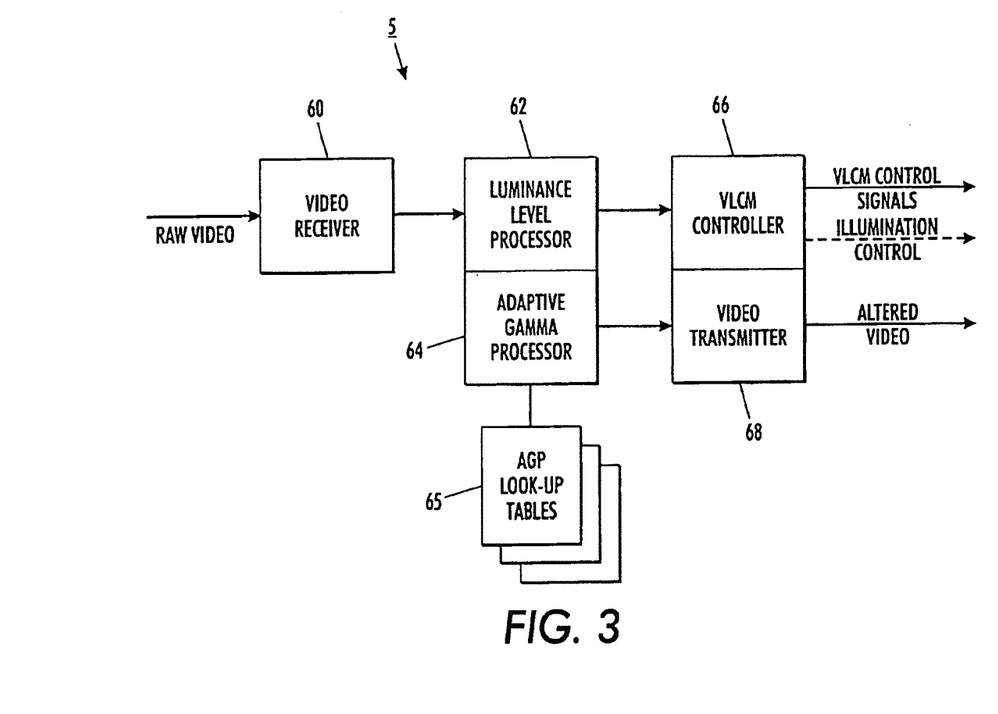
FIG. 3 is a schematic block diagram illustrating components of the adaptive luminance control module in accordance with an aspect of the present invention.

Turning next to FIG. 3, depicted therein is a schematic block diagram illustrating components of the adaptive luminance control module (ALCM) 15 in accordance with an aspect of the present invention. The ALCM receives electronic video signals as raw video in any one of a plurality of formats (based upon the projector) and processes the video signals into separate and distinct signals that are suitable for electronically driving both an electronic imaging system, such as a typical video and/or data projector's imaging device(s)/driver(s), and the VLCM 13 via bus 17 (e.g., FIG. 2). The resulting signal sent to the electronic imaging system is ultimately combined optically with the output of the light engine and VLCM combination to faithfully reproduce the original electronic video signal.

In one embodiment, the ALCM consists of five sub-modules: The video receiver (VR) 60, the adaptive gamma processor (AGP) 64, the luminance level processor (LLP) 62, the video transmitter (VT) 68, and the VLCM controller (VLC) 66. The video receiver 60 sub-module portion of the ALCM performs the task of assuring input signal compatibility and conversion from various sources. The video receiver buffers the multiple-format electronic video input signals in a memory (not shown) and inputs them to a subsequent sub-module, the luminance level processor 62. The electronic video signals, input to the video receiver as raw video signals, may consist of, but are not limited to, composite video, S-video, component video, RGB video, RGBHV video, DVI video, HDMI video, etc.

The luminance level processor (LLP), sub-module 62, receives a video signal from the receiver 60 and passes an unaltered video signal to the AGP sub-module 64. It also derives, from this video pass-through signal, a selectable averaged, or peak, signal(s) and sends this information to the AGP in the form of a luminance content signal. It will be appreciated that various signal-sampling methodologies may be employed to sample and determine luminance levels of the video signals, and that any individual or combination of luminance content level detection techniques may be employed by the present invention. For example, a weighted average may be employed where brighter pixels receive greater weighting. The luminance level processor also inputs to the VLCM controller 66, a luminance control signal that is proportional to the luminance content signal sent to the AGP. The luminance content signal input to the AGP represents a percentage equal to or greater than 100% and the luminance control signal to the VLC represents a percentage equal to or less than 100%. In other words, the signals are based about a normative, 100% level. As the LLP 62 instructs the VLCM to restrict the optical throughput it also instructs the AGP 64 to utilize a look-up (gamma) table to increase the video signal the light output of the optical engine by a proportional amount. In this example the actual optical restriction amount and the video signal luminance increase are inverse and proportional.

After receiving the electronic video signal from the LLP sub-module 62, the adaptive gamma processor (AGP) sub-module performs the task of re-mapping the input voltage-to-output levels based on a set of defined lookup tables 65. The table to be used for a particular video frame is determined by the luminance content signal from the LLP and the resulting video output signal from the AGP is sent to the video transmitter sub-module 68. In other words, the luminance content signal acts as the table selector or table index, and the individual video signals then select the location or point into the table and the AGP outputs the signal stored in the table at the position pointed to. It will be appreciated by those skilled in the art of signal processing, that the lookup tables employed may be preprogrammed and stored in memory associated with AGP 64. Moreover, it may be possible to load or select from one or more sets of lookup tables, based upon a user-selected preference or environmental variables such as room lighting. As will be further appreciated, the lookup tables effectively perform a transformation operation, by remapping the signals, and that alternative methods of performing such transformations are intended to be included within the scope of the present invention, including but not limited to gate arrays and similar programmable devices.

Similarly, since existing illumination sources utilize lamps/bulbs whose light output typically decreases with age, the present invention may also be employed to compensate for the output/brightness decay. The look-up tables can be further modified to allow a built-in illumination source (lamp/bulb) lamp output level decay algorithm to be coupled with an indicator of lamp life (e.g., an hour meter, counter, timer, etc.) to provide predicted steady-state illumination over the life of the bulb utilizing the VCLM as the illumination compensation modulator. Another, more accurate, method would utilize a lamp/bulb output sensor to measure the actual output so as to characterize any decay, and thereby enable the ACLM to implement real-time correction information instead of predicted decay values. In any of the alternatives, the ACLM would, in response to an indication of the decay characteristic, adjust the VCLM to compensate for the decay or change in illumination. In other words, referring to FIGS. 2 and 9, for example, a light sensor or life timer (not shown) would provide feedback to the ACLM, which in turn would adjust the VCLM 13 or 913 to open or allow more illumination there through, to compensate for brightness decay.

In addition to and in concert with this brightness decay compensating function, the ACLM can be programmed to limit or control brightness so that the system provides almost any specific brightness or maximum illumination level from the projector. For example: a specific projector installation requires a 900 lumen projector due to screen size, screen fabric gain and ambient illumination. A 1500 lumen projector may be utilized and programmed to output maximum of 900 lumens. Due to the present invention's VCLM control capabilities, there are no losses of on/off or ANSI contrast ratios with this function. Furthermore, in this example the ALCM and VLCM modules have as much as 600 available lumens (the unused balance) as an available range to perform the brightness decay compensation.

In one embodiment, the AGP lookup tables are based on mathematical formulas with two fixed constants and a variable scale: 100% (average or peak) input signal usually outputs as 100% (average or peak) and a 0% input signal is output at 0%. In-between the 0% and 100% levels are values determined by entries in the lookup (or gamma) tables. These tables are derived from values optimized for contrast ratio yield and consider the specific projector optical engine employed. These lookup tables are graduated on percentages, scales or steps that ultimately correspond to I.R.E. signal levels.

The video transmitter (VT) sub-module 68 receives the processed video signal information from the AGP and buffers the signal, for transmission compatibility, into the imager driver system of the particular optical or light engine(s) employed.

The variable luminance controller (VLC), sub-module 66, receives the buffered luminance control signal from the LLP 62 and operates (drives) the VLCM directly via the VLCM Control bus 17 (FIG. 1). The VLC provides current, voltage and buffering drive signal to the VLCM that is in proportion to the luminance control signal from the LLP. The VLC may be equipped with a positional feedback sensor and associated circuitry for calibration when a mechanical VLCM is employed, or a thermal, transmissive or similar sensor and feedback circuit when an electronically controllable photo-resistive VLCM is employed.

In another embodiment, the present invention further contemplates pre-encoding the data for both the ALCM/VLCM settings and adjustments. For instance, the media on which a movie or similar performance is provided may include pre-encoded data that characterizes desired illumination settings, adjustments, etc. and control circuitry such as the ALCM could sense and receive such data from the media, either as a pre-defined lookup table or as "hints" that are encoded. Although the present invention is intended to operate in real-time, it will be appreciated that the limitations of certain hardware and control circuitry may impose a delay in operation and that in the event of such delay, related processing of data must be similarly delayed so as to remain in synchronization. For example, if a medium included illumination data or hints, the system utilizing such information may need to employ techniques to "look-ahead," and collect such information so as to avoid delaying output that relies or utilizes the information.

Figure 4:
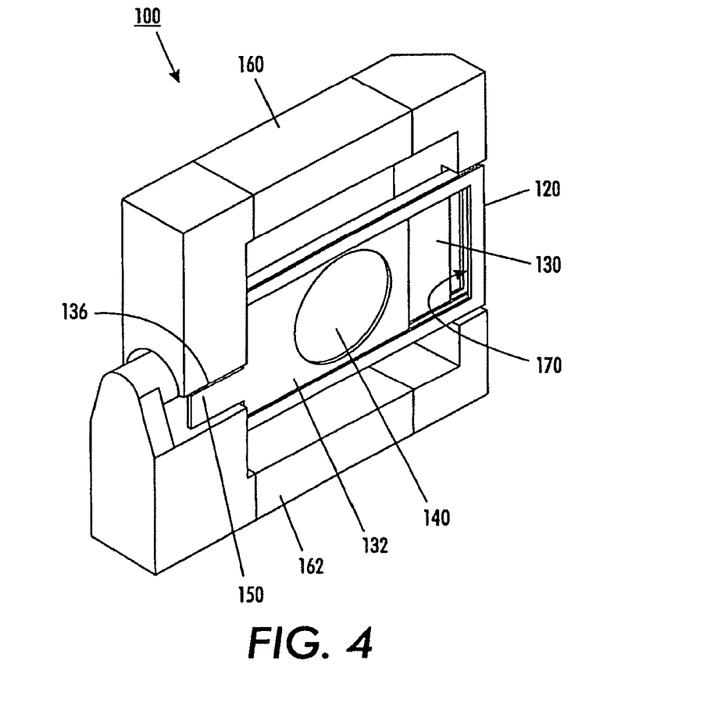
FIG. 4 is a perspective view of a shutter system in accordance with an aspect of the present invention.
Figure 5:
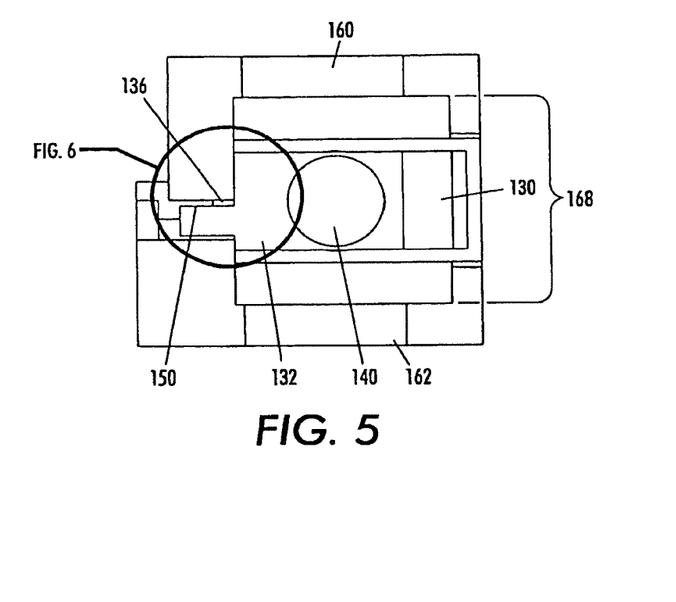
FIGS. 5 and 6 are orthographic representations of the system of FIG. 4 in alternative scales.
Figure 6:
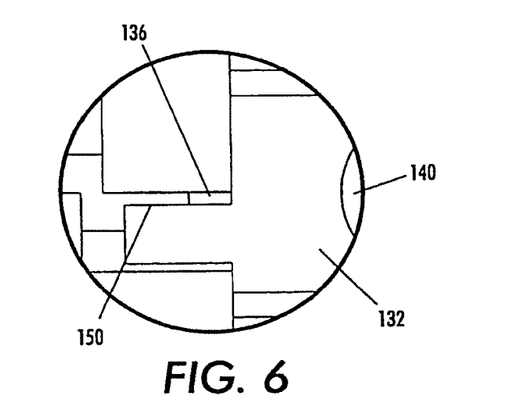

Referring next FIGS. 4-6, depicted therein is an exemplary iris-type VLCM. The multi-iris shutter system 100 is driven by a voice coil motor 110. Shutter system 100 is based on magneto-static principals; so as to provide a very efficient flux path (not shown) around an existing frame 120 containing lightweight titanium iris leaves 130 and 132. The inertia forces generated by the displaced coil-leaf systems (130, 132 and coil 136) are preferably balanced in order to reduce the vibrations. The end result is an extremely fast and efficient method to modulate the light levels by rapidly varying the size of an aperture 140 created using multiple irises leaves 130 and 132. Alternative devices to actuate the shutter system include servo and/or stepper motors configured in a way to move the opposing iris leaves back and forth to open and close the aperture. It should be understood that the magnetic circuit could also be totally to one side of the assembly if space permits.

Coil 136 is a wound tubular magnet wire, where the impedance of the coil is dependant on the number and size of the turns—for example a terminal resistance of approximately 12 ohms. The coil is supported by a "wish bone" structure 150 that provides added rigidity to the leaf and the coil structure. The slide mechanism introduced in the frame 120 provides a minimum friction while guiding the 0.45 inch movement of the iris leaves based on the size of the opening 140. The total dead mass of the coil 136 is counter balanced by the iris and "wish bone" components. Magnets 160 and 162 are pre-magnetized and assembled into the return path depicted generally by reference numeral 168, using an alignment fixture. The polarity of magnets 160 and 162 is such that they alternate from "North" to "South" as the flux travels through the circuit and generates a non-uniform 5,000 gauss field in the air gap denoted by reference numeral 168. The geometry of the pole structure provides a unique distribution of flux as seen by the VCM coil 136. This is necessary since the velocity profile requires very fast acceleration and decelerations during an 18 msec. cycle. This is part of an electromechanical device that drives the flux from the source "magnet" through the double air gap 168 and back. A low carbon steel alloy can be used since the magnetic saturation allows the flux density to operate around 18,000 gauss without running the risk of saturating the circuit.

Leaves 130 and 132 are two ultra thin leaves, each of approximately 0.5 mm in thickness, that can travel a total of approximately 12 mm (0.45 inch) from the center point relative to one another, hence forming an aperture or shutter system with a final shape similar to that of a "Cats Eye" although other shapes can be utilized to effect, differently, the amount of light allowed through for the various positions of the leaves. Although any leaf thickness can be used it will be optimized to provide the best mass for the acceleration necessary to obtain the designed performance. The innovative leaf/blade design allows high intensity light exposure without any distortion or degradation in performance. For increased durability, it will be appreciated that a titanium alloy may be used to form the leaf shapes. Although titanium is employed for its low-weight and high strength and temperature stability, the present invention further contemplates alternative metals, alloys and similar materials. It will be further appreciated that the leaves or other components of the iris assembly may be temperature resistant so as to provide consistent operation over a range of temperatures, for example from about 25° C. to at least about 250° C. The frame 120 provides precise location for the iris, and the leaves slide within 0.58 mm wide grooves 170 in the frame 120. The entire inner surfaces of the grooves require anti-friction treatment to reduce the sliding friction of the leaves. In assembly of the frame within the VCM, it will be appreciated that an alignment tool may be employed to position the frame with respect to the VCM coil.

The alignment tool could be used in conjunction with the assembly to center the iris opening on the light path through the system. Alternatively if an offset opening improves the capabilities of the system then that offset position could also be obtained through use of an alignment tool.

Figure 7:
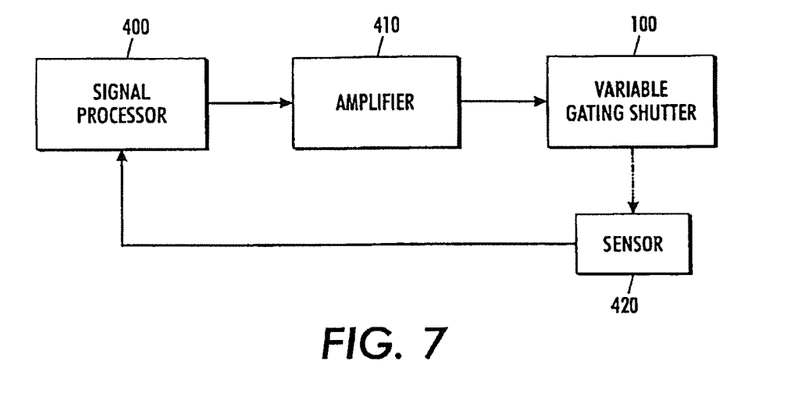
FIG. 7 is a simple schematic diagram illustrating a possible application of the present invention.

Referring next to FIG. 7, there is depicted a general schematic illustration of one embodiment of the present invention. In essence the EVCM receives an electronic signal from a digital amplifier 100, or more particularly the VLCM controller 66 described above, that causes the iris leaf to move. The movement is tracked by a digital linear encoder, quadrature encoder, optical linear encoder, or similar sensor, such as an optical infrared sensor, (e.g., in a computer optical mouse). The EVCM can be controlled with precision that permits incremental movements or absolute positioning. The optical sensor 420 will most likely be a consumer product-based design similar to a computer optical mouse tracking system. Flat flexible cable, or a printed circuit traces, would allow for maximum movements of the iris leaves, and faster termination by combining encoder signals, encoder power, two VCM phase current, and ground connections. The control signals from the signal processor 400 will be amplified to power the actuator of shutter system 100 and to drive the coil 136 forward and backward. Although described as a signal processor, the required functionality may be accomplished using any suitable control components, including an operational amplifier or microprocessor for position feedback and such components would be part of the ALCM described above.

In summary, the VCM receives an electronic signal from a digital amplifier that causes the iris leaf to move. The movement is tracked by a sensor such that the EVCM can be controlled with precision that permits 50 nm incremental moves in less than 18 ms. With respect to the above description then, it is to be realized that the optimum dimensional relationships for the parts of the iris-type VLCM, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Having described the various components and general operation of an embodiment of the present invention, attention is now directed to an example of the operation of the ALCM 15. Consider a video (frame) signal of 20% average luminance input into the video receiver 60, where it is buffered and sent to the luminance level processor 62, and where each frame is averaged and/or peak detected to determine what processing should be implemented to the signal. The luminance level processor 62 decides the best way to process this particular video frame is by a factor of two; thus, a luminance content signal is derived and sent to the AGP and a proportional luminance control signal is derived and sent to the VLC 66.

The luminance content signal directs the AGP 64 to use a particular lookup table. The AGP, using the lookup table, re-maps the video signal from the VR to 40% average luminance by direction of the selected example table and passes the resulting video signal to the video transmitter 68 where it is buffered into the projector's imager(s)/driver(s) which renders an average output level of 40% (i.e. light output capacity of the optical engine). The LLP's inverse and proportional luminance control signal of 50% is sent to the VLC 66, then buffered and sent to the VLCM 36.

The VLCM, via optical or other means, restricts the projector's optical engine maximum light output capability by 50% and therefore restores the projector's brightness output to the original signal level's intended 20% average. In this example the contrast ratio yield from the optical engine and VLCM combination under the control of the ALCM (at a 20% video signal) is approximately twice that which would be available from an otherwise identical but unequipped optical engine.

To further illustrate the operation of the present invention, the following examples are provided for purposes of illustration, and are not intended to limit the scope of the present invention.

To better understand the yields of this invention, consider a projector using the single chip DLP projector such as a Virtuoso HT720™. The following is assumed for both examples presented below: out-of-the-box the HT720 projector exhibits close to 1000 lumens and a 1200-1 ON/OFF contrast ratio (@ 6500) and an ANSI contrast of about 300 to 350-1.

First an alternative embodiment is described, with the VLCM and simpler adaptive processing in the form of automatic tracking of the general illumination levels (average illumination) and the black level clamp:

a. Assumption: set VLCM limits range for maximum closure that yields 400-lumens and for a maximum opening that yields 1000 lumens (i.e. no aperture restriction).

b. Assumption: the VLCM full open yields a contrast ratio of 1200-1 and in full closure yields 2500-1. This is an accurate number based on several experiment versions and the fact that the projector, when provided with a certain fixed in-between value iris, produces 600 lumens and a contrast ratio of 2000-1. This is the result of the optical engine's contrast ratio increasing substantially as the aperture restricts, but at the cost of less light output.

c. In this example, with the VLCM partially closed, the projector yields 2500-1 contrast ratio @ 400 lumens. However, the projector will still be capable of generating an image @ 1000 lumens with the VLCM fully open. The formula for the resulting usable contrast ratio is 2500×2.5=6250-1 contrast ratio. The 2.5× multiplier is derived from the available image brightness increasing from 400 to 1000 lumens: a 2.5-fold increase.

As a general rule the real limit for projector contrast ratio with brighter images is represented by the ANSI contrast ratio. What this design accomplishes is that it extends available ANSI CR to much lower general illumination levels. Simply put, ANSI CR is severely limited by ON/OFF contrast ratio at low IRE signals.

For example, a 5 IRE signal is actually less than 1% of an imaging device's full luminance output capability. If a typical projector exhibits a contrast ratio of 1200-1, then for a 5 IRE peak scene, the maximum contrast ratio actually available for use in the resulting image is approximately 12-1 (the difference between on/off CR and a 1% peak scene). In the simple example outlined above, the contrast ratio at 5 IRE is improved significantly to approximately 62-1. Since the human eye is sensitive to these very low levels of contrast ratio (anything below 200/300-1 is generally deemed detrimental) the image loses both depth and dynamic. Since both numbers are still below the ANSI capability of the projector it is demonstrable that further improvement may be provided by this invention.

In yet another example, an adaptive iris and peak based adaptive processing in the form of automatic tracking of the brightest object (peak illumination detection) in an image and the "black level clamp" is employed:
  a. Assumption: the VLCM range is set for maximum closure that yields near 100 lumens and for a maximum opening that yields 1000 lumens (again no restriction).
  b. Assumption: the VLCM, full open, yields contrast ratio of 1200-1 and in full closure around 3500-1 (3500-1 contrast ratio is achievable when a 1000 lumen projector is limited to only 100 lumen maximum output). Again, this is a realistic number based on multiple experiments/observations.
  c. In this second example, with VLCM closed, the projector yields 3500-1 contrast ratio @ around 100 lumens. However, the projector will still be capable of generating an image @ 1000 lumens with the VLCM set at no restriction (full open). Again, the formula for the resultant usable is contrast ratio=3500×"X". And again, the "X" multiplier is derived from the image brightness increasing from lower lumen yield level to 1000 lumens. If, the resulting optimum iris closure lumen yield is 100 lumens, then the available contrast ratio is 3500×10=35,000-1

In this second example, the contrast ratio at 5 IRE is improved to 350-1 which is now a level that matches/exceeds the unit's ANSI CR capability. In reality it is possible, at best, to equal but never exceed a projector's ANSI CR capability at very low illumination levels. This example yields results similar to what CRT units can generate at this illumination level resulting in a similar depth and dynamics in the image.

Dynamic processing in the ALCM compensates for various VLCM modulated brightness levels. It is important to understand the role of the dynamic processing in how it relates to the function of the iris. If the second example above is considered, a 5 IRE peak signal is somewhere within the image, and it would, without gamma re-processing, really be much lower in intensity on the screen due to the VLCM being constricted by a signal from the processor. However the adaptive processing will, in addition to setting the VLCM aperture at about 90% restriction, reinterpret the 5 IRE and output a much higher video signal for the projector; near 100 IRE. This in turn instructs the projector's imager to operate near or at 100% intensity (see ALCM operation example above) and, in turn, overcomes the optical brightness restriction imposed by the VLCM and the peak portion of the image appears as the proper 5 IRE level on the screen. It is this concept; to take a low-brightness signal (peak/average) and apply it as a high-brightness signal (peak/average) to the imager(s) and restrict it back to proper level with the VLCM, which yields the greatest improvement.

One might consider this in the following manner: currently light-valve projectors can output lumens right up to their maximum output ability regardless of what is really needed to reproduce the brightest peak in an image or frame. Unless the image calls for a 100 IRE component in the frame, this "excess" light output capacity reduces available contrast ratio due to imperfections in the optical engine. The ALCM/VLVM equipped optical engine in effect produces only enough light to reproduce the average or peak illumination called for in a particular frame or image and no more. Calculating the multiple input to output gamma curves is critical for this system's operation. Mapping and measuring the correct curves is required, and the minimum number of VLCM "stops" required to operate seamlessly require investigation into each type of optical engine to determine the optimum operation. It is further anticipated that there may be some practical limitations of the present invention. For example, few low-level scenes are "somewhat uniform" in illumination. A bright streetlight or car headlight or a flashlight at or near 100 IRE, present in an otherwise very dark scene, would "only" yield a contrast ratio that is native to the projector. However, such "peak" image items are usually presented at something less than 100 IRE and this adaptive system will make the most out of them by boosting these bright items to 100% imager output capacity and by inversely restricting the VLCM the proper amount. In other words, it is possible to artificially decrease the luminance for these bright items because it decreases the instantaneous black level and this can improve the overall image fidelity compared to keeping the higher black level. It is possible with processing to artificially expand, to a degree, the illumination changes between gamma "steps" particularly at lower levels. This can result in increased "depth" perception for low IRE scenes from the projector and better handling of these steps by the projector's imager(s). This will be applicable to any light-valve projector equipped with this technology.

Another advantage with this technology is the reduction of DLP "dither." "Dither" is the result of a time-division scheme to allow DLP equipped projectors the ability to display very-low IRE signals that are beyond the minimum on/off state and time-per-frame capability of the DMD chip(s) micro-mirror's. With the present invention it is no longer necessary, in lower illumination scenes, to drive the DMD to those IRE levels that produce the worst dither states. In other words a 0.1 IRE signal might place the DMD into dither (or time/division) to try and create that low level signal. With this technology an approximately 0.1 IRE signal would be reprocessed as something much higher, up to 1 IRE and be restricted by the iris back to a 0.1 IRE yield on the screen thus reducing the amount of "dithering" in very low illumination scenes. Although generally color separation artifact (commonly called rainbows) neutral when applied to DMD panel optical engines, aspects of the present invention may aid in the reduction of rainbows (time/division color separation artifacts), particularly at lower IRE illumination levels. Another benefit of the invention is the ability of a projector manufacturer to reprioritize the design goals of a projector's optical engine. Almost universally, contrast ratio is sacrificed for brightness as a compromise in optical engine design. With this invention, the consideration of design requirements may be modified to allow brightness and other aspects of image reproduction to be higher in priority and in turn use this invention's capability to boost the contrast ratio without sacrificing brightness.

In recapitulation, the present invention is a method and apparatus for increasing effective contrast ratio and brightness yields for digital light valve image projectors using a variable luminance control mechanism (VLCM), associated with the projector optics, for receiving the light output and provide a correction thereto; and an adaptive luminance control module (ALCM) for receiving signals from said video input board, said adaptive luminance control module producing a signal on, a VLCM bus connecting the variable luminance control mechanism and the adaptive luminance control module, said signal causing the variable luminance control mechanism to change the luminance of the light output and provide a corrected video signal for the projector. It is, therefore, apparent that there has been provided, in accordance with the present invention, a method and apparatus for increasing effective contrast ratio and brightness yields for digital light valve image projectors. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A video projector for projecting the image of a received video signal, the projector comprising:
    an illumination source;
    a projection lens adapted to receive and project light generated by said illumination source;
    at least one imaging device configured to modulate incident light in response to a received video signal wherein the video signal comprises one or more individual frames;
    a light engine providing a light path extending from the illumination source to and through the projection lens, the light path being incident on at least a portion of the imaging device whereby at least a portion of the light in the light path is modulated in accordance with the received video signal;
    a luminance control mechanism at least partially disposed in the light path and adapted to at least partially control the transmission of light through the light path in response to an applied luminance control signal; and
    an adaptive luminance control module configured to generate and output, in response to the luminance level of at least one individual frame within the received video signal, a luminance control signal for application to the luminance control mechanism to control the effective contrast of the projected image.

2. The video projector of claim 1, wherein the luminance control mechanism comprises an electro-mechanical iris controlled by the luminance control signal.

3. The video projector of claim 2 wherein the iris is oval or cats-eye shaped.

4. The video projector of claim 2, wherein the luminance control mechanism includes a sensor adapted to generate a feedback signal for application to the luminance control module in response to a position of the iris to assist the module in controlling the iris.

5. The video projector of claim 1, wherein the adaptive luminance control module includes at least one look-up table, whereby the luminance control module is adapted to utilize the look-up table to generate the luminance control signal.

6. The video projector of claim 1, wherein in response to an increasing luminance level in multiple individual frames of the received video signal the adaptive luminance control module varies the luminance control signal to cause a decrease in light throughput by the luminance control mechanism.

7. The video projector of claim 1, further including a sensor for sensing ambient light, the sensor generating an ambient light indicative signal for application to the adaptive luminance control module, the adaptive luminance control module varying, at least in part in response to the ambient light indicative signal, the luminance control signal to cause the luminance control mechanism to vary the luminance level provided in the light path with changes in ambient light.

8. The video projector of claim 1, further including a media-content input device adapted to generate a content signal for application to the adaptive luminance control module, the adaptive luminance control module varying, at least in part in response to the luminance content signal, the luminance control signal to cause the luminance control mechanism to vary the luminance level with changes in media content or user preference.

* * * * *